T. G. Otterson,
Fruit Jar.
No. 2,977. Reissued June 9, 1868.
Fig. 1.
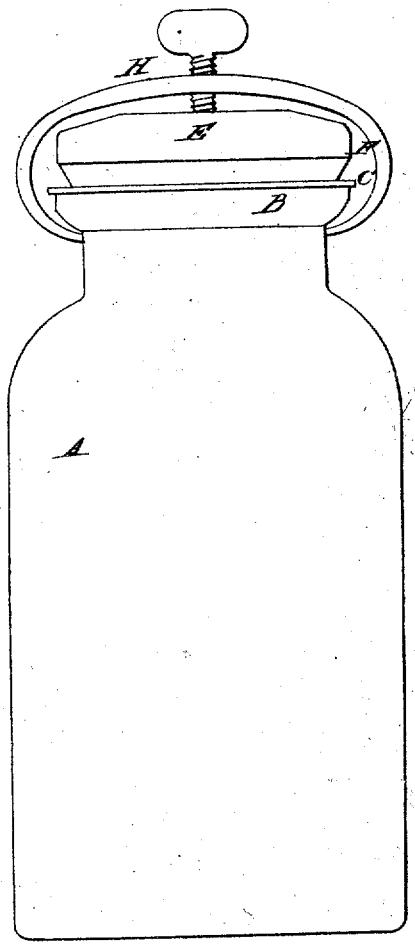
Fig. 2.
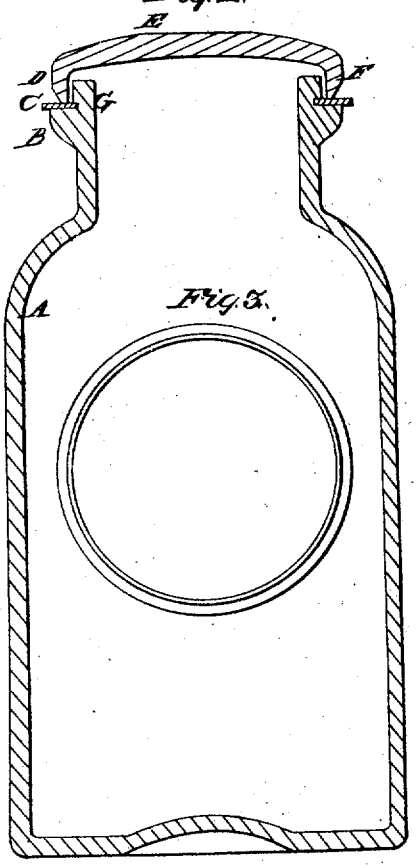
Fig. 3.
Witnesses:
John Goulding
J. E. Dennis
Inventor:
Thos G. Otterson
By his Attorney
S. Dennis Jr.

UNITED STATES PATENT OFFICE.

S. B. ROWLEY, OF PHILADELPHIA, PENNSYLVANIA, ASSIGNEE, BY MESNE ASSIGNMENTS, OF THOMAS G. OTTERSON, OF MILLVILLE, NEW JERSEY.

IMPROVEMENT IN FRUIT-JARS.

Specification forming part of Letters Patent No. 36,853, dated November 4, 1862; Reissue No. 2,977, dated June 9, 1868.

*To all whom it may concern:*

Be it known that I, S. B. ROWLEY, of Philadelphia, Pennsylvania, have become the owner, by mesne assignments, of certain Letters Patent for Improvements in Air-Tight Jars granted to T. G. OTTERSON November 4, 1862; and I do hereby declare the following to be a full, clear, and exact description of the said invention, which consists of a recess formed below the mouth and above a shoulder on the exterior of a jar, so as to retain the gum packing-ring in its position.

I will now proceed to describe the manner in which the said improvements may be carried into effect, reference being had to the accompanying drawings, which form a part of this specification, and in which—

Figure 1 is an exterior view of the jar with the improvements; Fig. 2, a vertical section, and Fig. 3 represents the under side of the cover.

A represents a glass jar, the body of which may be made in the form shown in the drawings, or in any other desired form. Round the neck of the jar is made a flange or rib, B, in such a position as to form below the mouth a shoulder for receiving the packing-ring C of gum-elastic or other suitable material, which ring surrounds and is maintained in its position by the portion of the jar which projects above this shoulder. This portion of the jar which projects above the shoulder for receiving the ring is overlapped by the flange of a cover, E, the said flange being caused to bear on the packing by an ordinary yoke, H, or other fastening. In the present instance the flange D of the cover is beveled, so that its lower edge may be narrow and penetrate the packing. A groove is made in the jar just above the shoulder for the reception of the inner edge of the packing-ring, which, after being expanded when placed over the mouth, will contract and enter the groove, the latter thus serving to maintain the ring in its proper vertical position.

I wish it to be understood that I do not desire to claim, broadly, as the invention of T. G. OTTERSON a cover having a flange overlapping the mouth of a vessel and resting on a packing on a shoulder formed beneath the said mouth; but

I claim as an improvement on fruit-jars of this class and as the invention of the said T. G. OTTERSON—

The within-described recess formed on the exterior of the jar beneath the mouth of the same, the bottom of the recess forming a continuation of the shoulder on the neck of the jar, all substantially as and for the purpose herein set forth.

In testimony whereof I have signed my name to this specification before two subscribing witnesses.

S. B. ROWLEY.

Witnesses:
W. J. BRUCE,
F. C. WHITE.